United States Patent Office 3,447,545
Patented June 3, 1969

3,447,545
RECLAMATION OF LIQUIDS USED IN VEHICLE WASHING
Raymond L. Lawter, Zanesville, Ohio, assignor, by mesne assignments, to Dura Corporation, Oak Park, Mich., a corporation of New York
Original application Sept. 27, 1966, Ser. No. 490,436, now Patent No. 3,378,018, dated Apr. 16, 1968. Divided and this application Aug. 30, 1967, Ser. No. 664,374
Int. Cl. B08b 3/00
U.S. Cl. 134—101            3 Claims

ABSTRACT OF THE DISCLOSURE

The reclamation of liquids used in car washing in which the slurry of water and grit drained from such washing operation is forced to a cyclone separator from which the clean water is delivered to a tank. The water is forced from the tank to the car washing module. The cyclone separator as well as the pump which forces the slurry thereto may be mounted on the tank to provide a self-contained assembly. A proportioning injector may be used to mix a quantity of liquid from the tank with the slurry which is forced to the cyclone separator.

CROSS REFERENCE TO RELATED APPLICATION

This application constitutes a division of copending application Ser. No. 490,436, filed Sept. 27, 1966, and now Patent No. 3,378,018, entitled "Reclamation of Liquids Used in Vehicle Washing" whose applicant is Raymond L. Lawter.

BACKGROUND OF THE INVENTION

Heretofore, a large volume of water is lost in car washing operations of the type in which a car is progressed through a series of stations where, in succession washing, rinsing and drying operations are performed. In parts of the country where water shortages exist and where water costs are high, adequate and efficient reclamation of water is an important factor.

The prior art as exemplified by U.S. patents to Piquerez 2,139,096 of Dec. 6, 1938 and Lind et al. 2,922,173 of Jan. 26, 1960 fail efficiently, economically and speedily to effect the separation of grit, grime and other impurities from the water after washing and returning it to the car washing module. They involve too many liquid treating stations which not only complicate the system but increase the cost of maintenance and operation.

SUMMARY

The invention is directed to a simple water reclamation system for car washing operations by which the slurry of water and grit drained from the washing procedure is quickly forced at high velocity through a cyclone separator which separates the water from the grit and the like and then returns the water to a tank from which it is pumped to the car washing module. Thus, except for the pumps and the drivers therefor, there are no moving parts. The cyclone separator is simple and efficient and speedily does its job. Thus, as compared to prior installations, there is provided a relatively inexpensive system free of severe maintenance problems. There is further made available a self-contained assembly of a tank, cyclone separator and a pump for the latter which greatly simplifies installation costs and problems and makes available to the relatively small car washing operation a water reclamation device at reasonable cost and free of the complicated costly devices heretofore provided.

DESCRIPTION OF THE PREFERRED EMBODIMENTS

Figure 1:
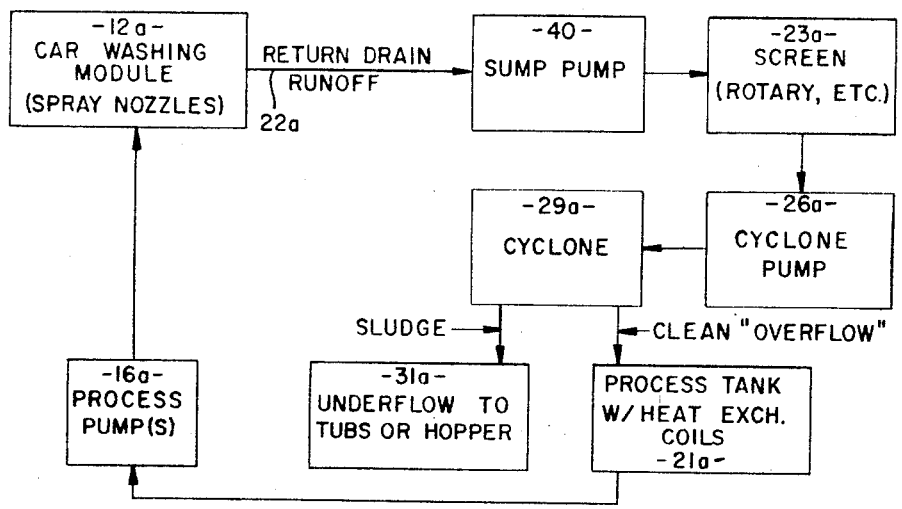
FIGURE 1 is a diagrammatic view of a water reclaiming system employing a cyclone separator to which the slurry of water and grit from the car washing module after first being screened of large particles, is pumped, the clean water being delivered to a tank from which it is pumped for car washing purposes.

In the system shown in FIGURE 1, 12a designates the car washing module which is equipped with spray nozzles of any well known structure and from this module the slurry passes through a trough or the like 22a constituting a run-off leading to a suitable motor driven sump pump 40. The slurry then passes through a screen 23a and this may be a stationary or a rotary screen, as desired, for removing the larger foreign particles. The slurry then is forced by an electric motor driven cyclone pump which forces the slurry at high velocity through a cyclone 29a similar to the cyclone 29. Cyclone separators are well known to those skilled in the art. Suffice it to say that in the cyclone to which the slurry is forced at high velocity, the slurry spirals downward and inward and transfers to an upward spiraling column of liquid extending from the rejects outlet at the lower end to the clean water outlet at the upper end. A liquid free column of cylindrical shape forms about the central axis. The angular velocity within the housing increases from the periphery of the housing to the liquid-free axis, creating zones of different angular velocities. The dirt and foreign particles are carried downward toward the apex of the cone where they are continuously discharged through the open end. From the cyclone 29a the clean overflow is delivered to a process tank 21a which may be equipped with heat exchange coils, somewhat to heat the water to effect more efficient car washing. The sludge, or foreign matter, from the cyclone 29a passes to tubs or a hopper 31a. From the process tank 21a the clean water is forced by one or more high pressure process pumps 16a to the spray nozzles of the car washing module 12a.

Figure 2:
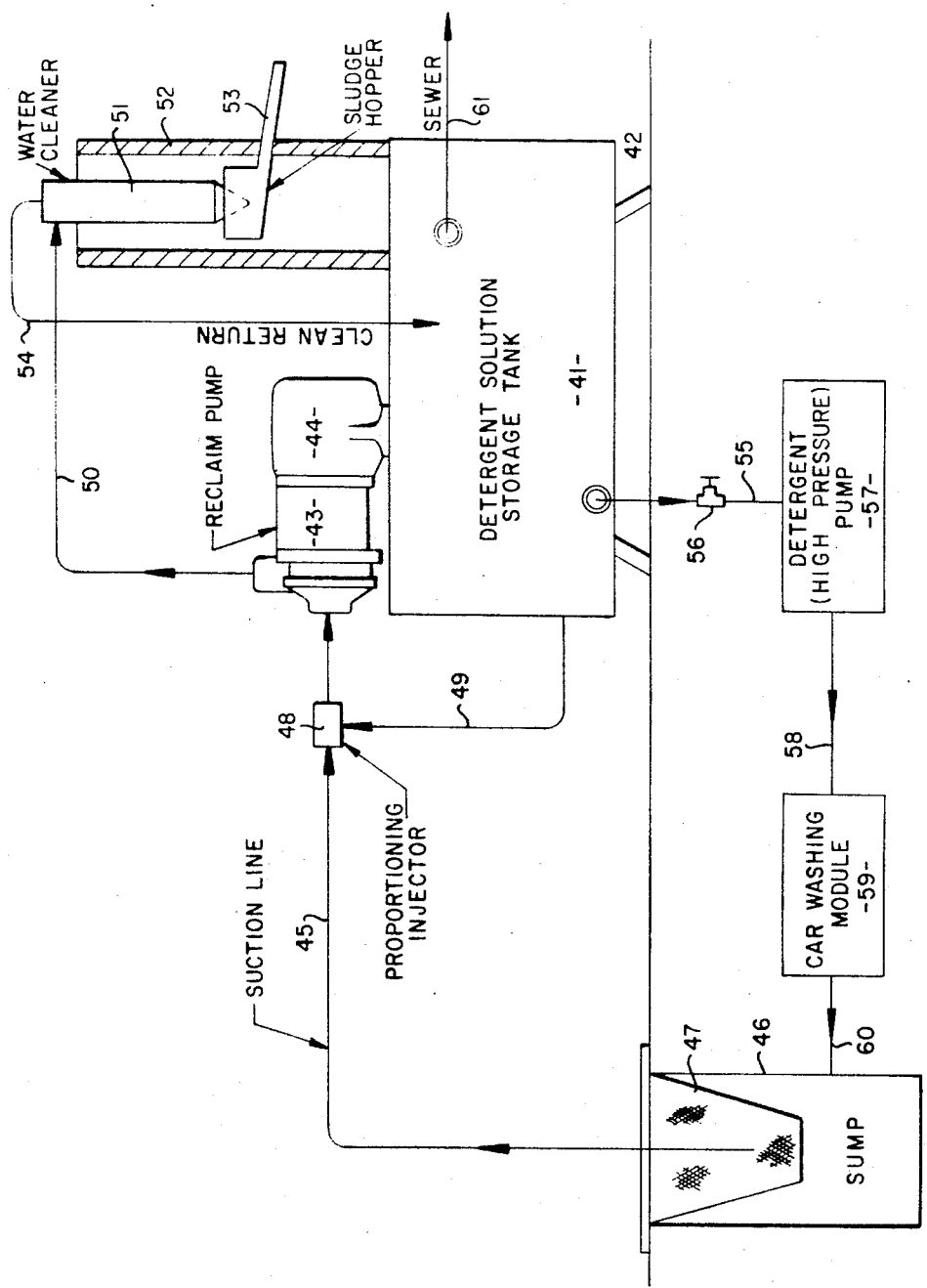
FIGURE 2 is a diagrammatic view of a system similar to that shown in FIGURE 1 but providing a package unit in which the cyclone separator and its pump are carried by the tank.

FIGURE 2 shows an alternate form which essentially is a package water reclaiming system containing the more important elements of the system in a compact, efficient arrangement. As shown, a storage tank which contains, for example, the detergent solution is mounted on supporting legs 42. Suitably mounted upon the top of the storage tank is a high velocity pump 43 for handling the slurry, which is driven by an electric motor 44. The slurry is drawn by the pump 43 from a sump 46 and passes through a suitable filter screen 47 for removing the larger foreign particles. A pipe line 45 leads from the sump 46 to the pump 43 and interposed in the line is a suitable proportioning injector for mixing liquid from the lower portion of the storage tank 41 through a pipe line 49 so that a portion of the clean water or solution is mixed with the slurry to enable it to be more readily handled by the pump 43. The pump 43 forces the slurry through a discharge line 50 to a cyclone separator 51 which is carried by a supporting standard 52 mounted on the top of the tank 41. The underflow from the cyclone 51 is discharged through a chute 53 carried by the standard 52 and leading to the outside. The overflow from the cyclone 51 constituting the clean water then passes through the overflow pipe 54 to the storage tank 41. From the bottom portion of the tank 41 a pipe 55 having a manual valve 56 leads to a high pressure pump 57 for forcing the clean liquid to the car washing module 59, where the solution is sprayed on the automobile body. From the module 59 the slurry passes through the run-off 60 to the sump 46. From the upper portion of the tank 41 a line 61 leads to the sewer.

An important feature of the system illustrated in FIGURE 2 is the arrangement of the motor driven pump 43, the cyclone 51 and piping associated therewith which are mounted upon and carried by the tank 41 so that this can be installed as a unit in position of use and eliminate the necessity of mounting and arranging these various parts and simplifies installation problems.

Although the description has been directed to the washing of automobile bodies, it can be used to advantage with respect to other vehicles. Furthermore, numerous changes in details of arrangement and operation may be made without departing from the spirit of the invention, especially as defined in the appended claims.

What I claim is:

1. A water reclaiming system for car washing operations comprising:
    a tank for water,
    a car washing module,
    means including a first pump for forcing water from said tank to said car washing module,
    a cyclone separator,
    means independent of said tank and including a second pump for forcing a slurry of water and grit drained from said car washing module to said cyclone separator, a proportioning injector connected respectively with the inlet of said second pump and said tank to enable the slurry from said car washing module to be mixed with water from said tank, and
    means for conducting clean water from said cyclone separator to said tank.

2. A water reclaiming system as claimed in claim 1 comprising:
    a motor driven sump pump and screening means interposed between said car washing module and said second pump.

3. A water reclaiming system as claimed in claim 1 comprising:
    a support on said tank for said cyclone separator, and
    a mounting on said tank for said second pump thereby to provide a self-contained assembly including said tank, said cyclone separator and said second pump.

References Cited

UNITED STATES PATENTS

| | | |
|---|---|---|
| 2,139,096 | 12/1938 | Piquerez. |
| 2,660,744 | 12/1953 | Cockrell _____ 134—101 XR |
| 2,922,173 | 1/1960 | Lind et al. _____ 134—109 XR |
| 3,003,347 | 10/1961 | Morris et al. |
| 3,313,311 | 4/1967 | Gilson _____ 134—109 |

ROBERT L. BLEUTGE, *Primary Examiner.*

U.S. Cl. X.R.

134—109